July 26, 1966     J. E. MARTENS     3,262,737
MOVABLE SEAT BACK
Original Filed Jan. 25, 1962
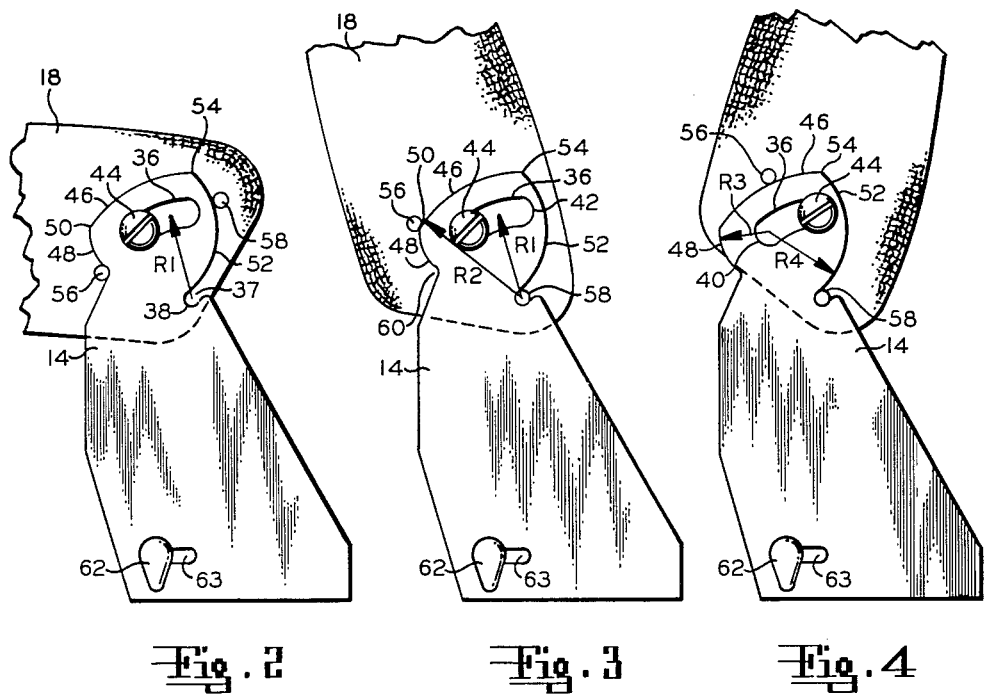
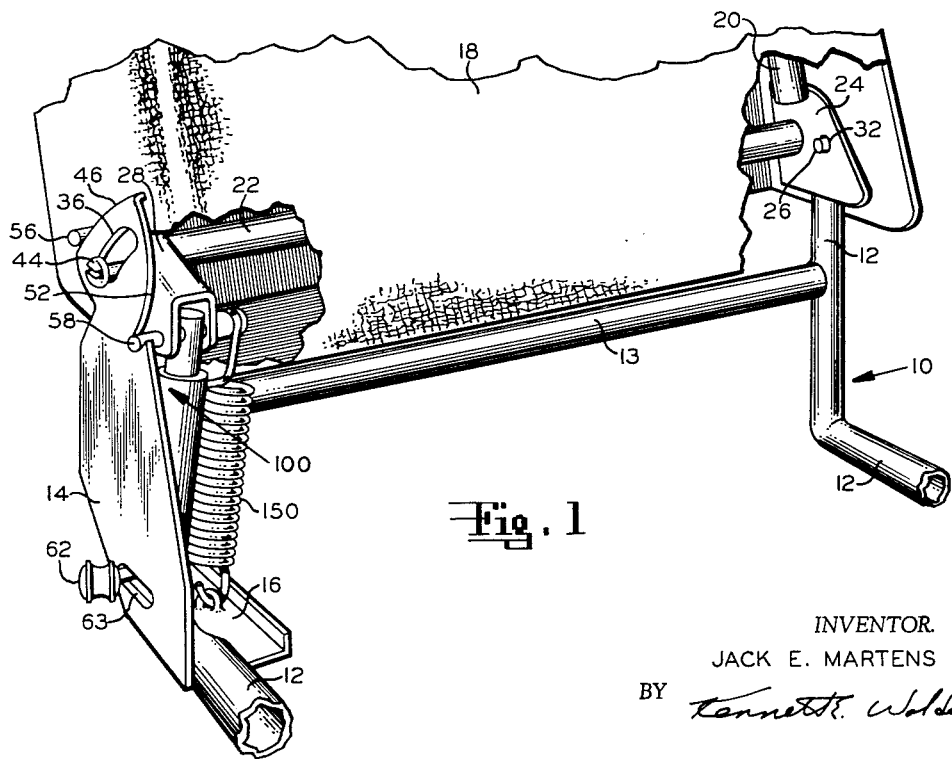
INVENTOR.
JACK E. MARTENS
BY
ATTORNEY United States Patent Office 3,262,737
Patented July 26, 1966

3,262,737
MOVABLE SEAT BACK
Jack E. Martens, Gary, Ind., assignor to The Anderson Company, a corporation of Indiana
Original application Jan. 25, 1962, Ser. No. 168,785, now Patent No. 3,104,130, dated Sept. 17, 1963. Divided and this application May 9, 1963, Ser. No. 279,288
3 Claims. (Cl. 297—379)

This application is a division of my copending application Serial No. 168,785, filed January 25, 1962, and now issued as U.S. Patent 3,104,130.

This invention relates to a positionable seat back and more particularly is directed to the framework and holding or positioning device therefor.

Attention is being given by the automotive industry to the backs of the front seat of an automobile wherein they may be reclined horizontally. It is also necessary in two-door automobiles to provide for pivotal movement of the back of the seat from an upright position to a forward position whereby passengers are admitted to or from the rear seat.

Therefore, an object of this invention is to provide the structure permitting the back of an automobile seat to be pivoted backward to a reclined position.

Another object of this invention is to provide structure permitting the back to be held in the upright position.

Another object of this invention is to provide for tilting of the back of the seat forward of the upright position to admit passengers into the back seat of a two-door automobile.

Another object of this invention is to provide a structure whereby the back of the seat pivots about one axis to the reclining position and about a second axis to the forward tilting position.

Another object of this invention is to provide for a tilting of the back inwardly as it is pivoted forward of its upright position.

Other objects and advantages of the invention will become apparent after the description hereinafter set forth is considered in conjunction with the drawings annexed hereto.

In the drawings:
FIGURE 1 is an isometric front view, partly in section, of the supporting frame, pivoting mechanism and a holding or position-retaining device;
FIGURE 2 is a partial side view of the seat showing the side bracket and the back in reclined position;
FIGURE 3 is another partial side view of the seat showing the bracket and the back in upright or normal position;
FIGURE 4 is another partial side view of the seat showing the bracket and the back in a tilted forward position.

The structure shown in FIGURE 1 represents the front right-hand or passenger seat back of a two-door sedan automobile. The driver's seat back would have corresponding parts reversed as to position. Numeral 10 indicates generally the frame. The frame has a pair of base portions 12, connected by bar 13, which are adaptable to be secured in position on the floor of an automobile. The inside portion of the frame has a vertical extension 12' which is provided with a pin 26 for cooperation with plate structure 24 to pivotally support the back or back rest 18 at one side. The outside portion of frame 12, opposite frame portion 12', has secured thereto a side bracket 14 which includes a base portion 16. This bracket provides a plurality of pivotal supports for the back and which will be described more in detail later in this specification.

Back 18 is supported by a frame having upright side portions 20 (only one of which is shown) and a tie bar 22 across the bottom. A plate 24 is fixedly carried by one side of the frame 20 for pivotal movement about pin 26 which projects inwardly from frame 12'. A U-shaped bracket 28 is fixedly supported on the other side of frame 20 substantially opposite plate 24. Bracket 28 serves as a fastening means for one end of the positioning device to be more fully described, and supports a pin, bolt or stud 44 projecting from the side thereof. Stud 44 of bracket 28 and aperture 32 of plate 24, disposed on opposite sides of frame 20, are axially aligned.

Side bracket 14 is fixedly supported on one side of frame 12 in an upright position, as shown in FIGURE 1. The true dimensions and proportions of this bracket are fairly accurately shown in FIGURES 2, 3 and 4, setting forth its geometry.

Referring particularly to FIGURES 2, 3 and 4, an arcuate slot 36 is provided in the upper portion of bracket 14 and is further defined as being located along an arc described by the end of a radius R1 swinging about pivot point 37 near notch or shoulder 38 located on the forward edge of the bracket. Arcuate guide slot or surface 36 terminates in ends 40 and 42, respectively, which limit the extent of arcuate travel of a bolt 44 therein. This bolt is fixed to the bracket 28, as most clearly shown in FIGURE 1, and projects through slot 36 and terminates in a head which retains the bolt in operative position within the slot. Bolt 44, as is evident from the disclosure in FIGURE 1, is also axially aligned with aperture 32 in plate 24 on the opposite side of frame 22.

Another arcuate guide surface 46 on the top edge of bracket 14 is described by the end of a radius R2 likewise swung about point 37, and is parallel with the arc of or edges of slot 36. Another arcuate guide surface 48, defining a rearward part of bracket 14, is described by the end of a radius R3 swung about the center of slot end 40. It can be seen that arcuate portions 46 and 48 meet at point 50 on bracket 14. Still another arcuate guide surface 52 described by the end of a radius R4 swings about the center of slot end 40. It can be seen that the lower part of arcuate surface 52 terminates at shoulder 38 near the center of the radius describing the arcuate slot 36. Surfaces 46 and 52 form juncture 54 where they meet.

The U-shaped bracket 28 is fixed to frame 20 oppositely disposed from plate 24 and is adapted to move in close proximity to side bracket 14. As mentioned above, bolt 44 projects from one of the depending portions 28' of bracket 28 for operatively arcuate movement in slot 36. Shown isometrically in FIGURE 1 and in elevation in FIGURES 2 through 4, it is to be noted that pins or studs 56 and 58 project from U bracket 28 parallel with bolt 44 in sliding proximity or contact with arcuate surfaces 48 and 52, respectively. Stud 58 extends through both depending portion or ears 28' of bracket 28 and provide means for pivotally fastening a positioning or holding device 100 thereto. This holding device will be described more fully later in the specification.

Assuming that the back 18 is in the normal position, as viewed in FIGURE 3, it can be seen that bolt 44 abuts slot end 40 in pivotal relation therewith and that stud 58 is received within shoulder 38 also in pivotal relation therewith. Also note that stud 56 is located adjacent intersection 50 of arcuate surfaces 46 and 48. Back 18 is movable to a reclined position by first releasing positioning mechanism 100 and pushing back 18 rearwardly or counterclockwise, as viewed in FIGURE 3. It can be seen that back 18, which carries bolt 44, will pivot about end 40 of slot 36 and that studs 56 and 58, positioned at a fixed distance from bolt 44, will move along surfaces 48 and 52, respectively, to the position shown in FIGURE 2. This is the reclined position for back 18 which is held in this position by the action of holding mechanism 100. Furthermore, it is to be noted that stud 56 bears against another notch or shoulder 60 at the lower portion of arcuate surface 48 to establish the limit of backward swinging movement or counterclockwise rotation (as seen in FIGURES 1-4) of the back 18 and to further hold the back in the reclined position. The back may, of course, be positioned anywhere between the extremes of FIGURES 2 and 3 and held from backward movement by holding mechanism 100.

Whenever it is desired to raise back 18 to the upright position, it is only necessary to move handle 62 forwardly in slot 63 of side plate 14 to thereby release the clutch mechanism of holding mechanism 100 whereupon back 18 will return by reason of spring 150 to the upright position of FIGURE 3. It can be seen that all pivotal movement will be between bolt 44 and end 40 of arcuate slot 36 and that this position is assured by reason of studs 56 and 58 sliding along arcuate surfaces 48 and 52, respectively.

Whenever stud 58 reaches shoulder 38, stud 56 is positioned at intersection 50 of arcuate surfaces 46 and 48. It will now be appreciated that forward or clockwise movement on back 18, as viewed in FIGURE 3, will cause back 18 to pivot forward about stud 58 bearing against shoulder 38 and that bolt 44 and stud 56 will move arcuately forward relative to slot 36 and arcuate surface 46 to the position shown in FIGURE 4. In this last-mentioned position, bolt 44 pivoting about stud 58 will come in contact with end 42 of the slot and prevent back 18 from moving forward beyond these limits. Back 18 is now in a position to admit passengers to or from a back of an automobile.

As pointed out previously in this specification, bolt 44 is axially and oppositely disposed from aperture 32 in plate 24. Therefore, it can be seen that as back 18 is moved rearwardly to the reclined position, all pivotal movement will take place along this axis. However, in the movement of the back 18 from the position of FIGURE 3 to that of FIGURE 4, it is pointed out that the pivotal movement is about the center of pin 58 or point 37 which is some distance below and forward of bolt 44 and opposite aperture 32. By this offsetting, it is apparent that back 18 will have an inward movement as it is pivoted forward about new pivot point 37. Stud 56 riding along arcuate surface 46 retains stud 58 in operative position against shoulder 38. Back 18 may be returned to the upright position of FIGURE 3 without any manipulation of handle 62 of holding mechanism 100. Release of holding mechanism 100 permits seat back 18 to be pivoted to the reclined position of FIGURE 2.

Attention is directed to the disclosure in my copending application, Serial No. 168,785, filed January 25, 1962, now U.S. Patent No. 3,104,130, for a description of the control mechanism designated by the numeral 100 in FIGURE 1 for holding the back rest in the desired position.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:
1. Structure for supporting a positionable back on a base for tilting movement rearwardly from a normal position about one axis and forwardly from a normal position about another axis,
   said base pivotally supporting one side of said positionable back at a single pivot,
   said base pivotally supporting the opposite side of said positionable back at first and second selective pivots thereby defining dual pivot axes each being common to said single pivot at said one side,
   said first pivot and said single pivot defining the axis about which said back is tilted rearwardly and said second pivot and said single pivot defining the axis about which said back is tilted forwardly,
   said first and second pivots being disposed on a side member of said base and cooperatively receiving first and second pin means respectively of said back,
   a first arcuate guide surface disposed adjacent said first pivot and a second arcuate guide surface disposed adjacent said second pivot,
   said first pin means pivoting in said first pivot and said second pin means traveling along said second arcuate guide for stabilizing said back as it is moved rearwardly from a normal position,
   said second pin means pivoting in said second pivot and said first pin means traveling along said first arcuate guide for stabilizing said back as it is moved forwardly from a normal position.

2. The structure of claim 1 wherein said second pivot is located forwardly of said first pivot.

3. The structure of claim 2 wherein a third pin means of said back is adapted to travel along additional arcuate guide means located rearwardly of said first pivot for further stabilizing said back.

References Cited by the Examiner

UNITED STATES PATENTS

| | | | |
|---|---|---|---|
| 1,793,045 | 2/1931 | Bitzenburger | 297—378 X |
| 2,132,729 | 10/1938 | Galamb et al. | 297—378 X |
| 2,578,305 | 12/1951 | Cushman | 297—374 X |
| 2,627,894 | 2/1953 | Herider et al. | 297—378 X |
| 2,955,644 | 10/1960 | Kramer | 296—44 |
| 2,988,398 | 6/1961 | Hamilton | 297—383 |
| 3,046,055 | 7/1962 | Martens | 297—361 |
| 3,059,970 | 10/1962 | Angell et al. | 297—353 |
| 3,062,584 | 11/1962 | Galla | 297—374 |

FRANK B. SHERRY, *Primary Examiner.*

R. B. FARLEY, *Assistant Examiner.*